US008213405B2

(12) United States Patent
Horn et al.

(10) Patent No.: US 8,213,405 B2
(45) Date of Patent: Jul. 3, 2012

(54) WIRELESS NETWORK SYNCHRONIZATION

(75) Inventors: Gavin B. Horn, La Jolla, CA (US);
Aamod D. Khandekar, San Diego, CA (US); Parag A. Agashe, San Diego, CA (US); Lei Xiao, Mountain View, CA (US); Ravi Palanki, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 718 days.

(21) Appl. No.: 12/354,666

(22) Filed: Jan. 15, 2009

(65) Prior Publication Data

US 2009/0196277 A1    Aug. 6, 2009

Related U.S. Application Data

(60) Provisional application No. 61/025,661, filed on Feb. 1, 2008, provisional application No. 61/091,096, filed on Aug. 22, 2008.

(51) Int. Cl.
*H04J 3/06* (2006.01)

(52) U.S. Cl. ........................................ 370/350; 370/503

(58) Field of Classification Search .................. 370/252, 370/332, 333, 350, 503, 509
See application file for complete search history.

(56) References Cited

U.S. PATENT DOCUMENTS

| 7,454,219 | B2 * | 11/2008 | Mege et al. | 455/503 |
| 2007/0099639 | A1 * | 5/2007 | Mege et al. | 455/502 |
| 2007/0171853 | A1 | 7/2007 | Jones et al. | |
| 2008/0019328 | A1 | 1/2008 | Rudnick | |
| 2008/0153493 | A1 * | 6/2008 | Salokannel et al. | 455/436 |
| 2008/0240075 | A1 * | 10/2008 | Yamaji | 370/350 |
| 2009/0131094 | A1 * | 5/2009 | Natsume | 455/522 |
| 2010/0157885 | A1 * | 6/2010 | Koyanagi et al. | 370/328 |

FOREIGN PATENT DOCUMENTS

| EP | 1802013 A1 | 6/2007 |
| WO | WO2006088472 A1 | 8/2006 |

OTHER PUBLICATIONS

International Search Report and Written Opinion—PCT/US2009/032158, International Search Authority—European Patent Office—Oct. 14, 2009.

* cited by examiner

*Primary Examiner* — Brian D Nguyen
(74) *Attorney, Agent, or Firm* — Francois A. Pelaez

(57) ABSTRACT

Systems and methodologies are described that facilitate synchronizing timing among wireless nodes in a wireless communication network. A tracking wireless node can synchronize to a global positioning system (GPS) signal if available. Alternatively, the tracking wireless node can receive quality metrics related to one or more target nodes. The quality metrics can relate to parameters that can be utilized to evaluate the target node for timing synchronization. Based on the quality metrics, the tracking wireless node can select a target wireless node for timing synchronization. The tracking wireless node can subsequently synchronize timing with the target wireless node. In addition, the tracking wireless node can continually evaluate surrounding wireless nodes to detect whether other wireless nodes have higher quality metrics than the current target wireless nodes and can accordingly resynchronize with nodes having higher metrics.

36 Claims, 13 Drawing Sheets

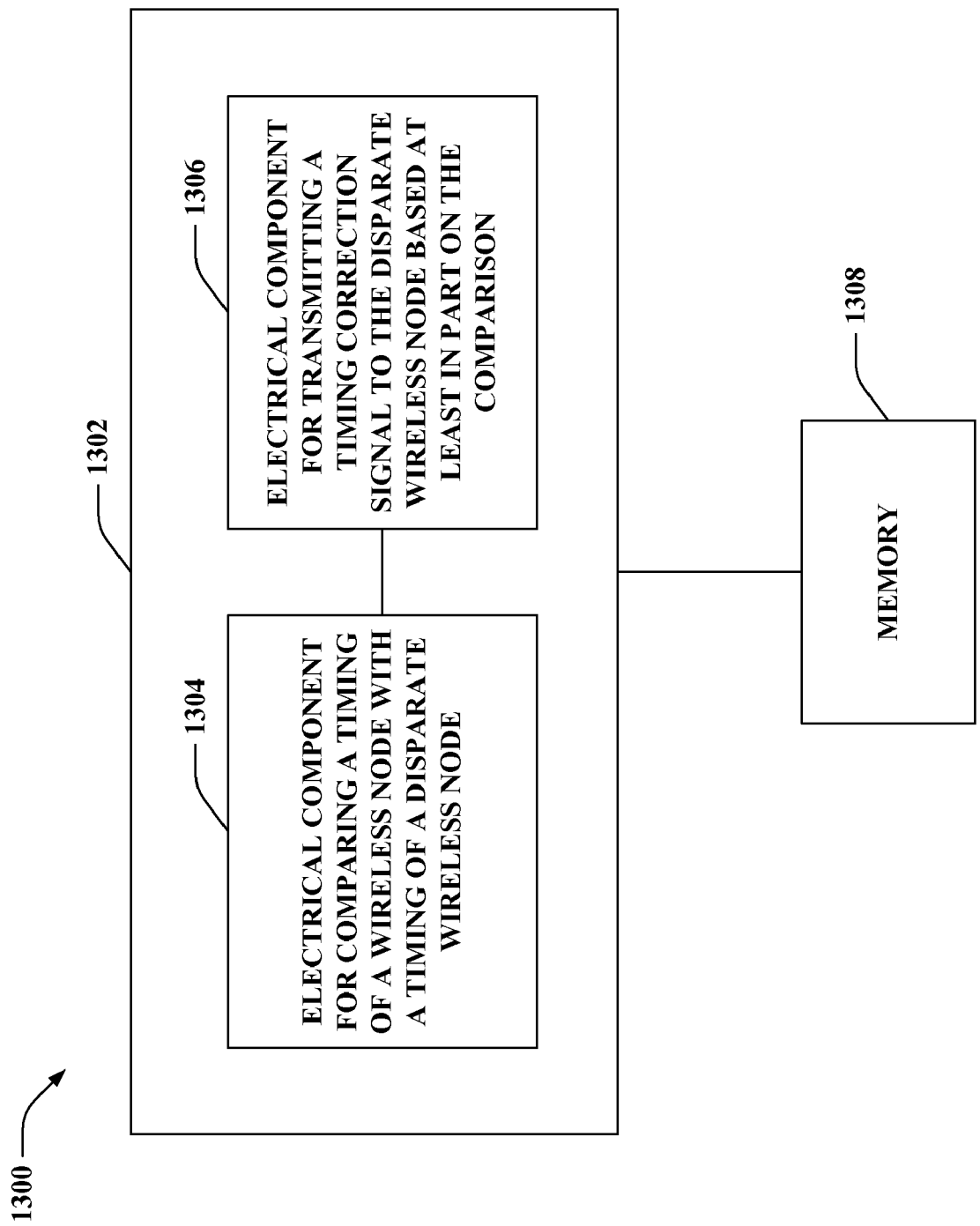

WIRELESS NETWORK SYNCHRONIZATION

CLAIM OF PRIORITY UNDER 35 U.S.C. §119

The present Application for Patent claims priority to Provisional Application No. 61/025,661 entitled "METHOD AND APPARATUS FOR SYNCHRONIZATION IN WIRELESS NETWORKS" filed Feb. 1, 2008, and assigned to the assignee hereof and hereby expressly incorporated by reference herein, as well as Provisional Application No. 61/091,096 entitled "TREE-BASED NETWORK SYNCHRONIZATION" filed Aug. 22, 2008, and assigned to the assignee hereof and hereby expressly incorporated by reference herein.

BACKGROUND

1. Field

The following description relates generally to wireless communications, and more particularly to synchronizing wireless nodes.

2. Background

Wireless communication systems are widely deployed to provide various types of communication content such as, for example, voice, data, and so on. Typical wireless communication systems may be multiple-access systems capable of supporting communication with multiple users by sharing available system resources (e.g., bandwidth, transmit power, ...). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP long term evolution (LTE), ultra mobile broadband (UMB), and/or multi-carrier wireless specifications such as evolution data optimized (EV-DO), one or more revisions thereof, etc.

Generally, wireless multiple-access communication systems may simultaneously support communication for multiple mobile devices. Each mobile device may communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations may be established via single-input single-output (SISO) systems, multiple-input single-output (MISO) systems, multiple-input multiple-output (MIMO) systems, and so forth. In addition, mobile devices can communicate with other mobile devices (and/or base stations with other base stations) in peer-to-peer wireless network configurations.

MIMO systems commonly employ multiple ($N_T$) transmit antennas and multiple ($N_R$) receive antennas for data transmission. The antennas can relate to both base stations and mobile devices, in one example, allowing bi-directional communication between the devices on the wireless network. In addition, the base stations and mobile devices can communicate over channels defined by portions of frequency over portions of time. In this regard, synchronizing the mobile devices and base stations can facilitate efficient and substantially accurate communication. Moreover, synchronizing base stations can ensure substantially accurate timing over a related wireless network such that mobile devices can communicate with multiple base stations without requiring major adjustment to timing of the mobile devices.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, various aspects are described in connection with facilitating synchronizing wireless nodes (e.g., access points and/or access terminals) in a wireless communication network. In particular, the wireless nodes can form a synchronization tree where the nodes can be associated with a quality metric. In this regard, lower quality metric wireless nodes can synchronize timing with nodes having a higher quality metric. There can be one or more root nodes, for example, from which lower nodes ultimately depend through the tree. In one example, the root node can be synchronized using global positioning system (GPS) technology such that substantially all dependent nodes can be substantially synchronized to GPS for timing regardless of whether the dependent nodes are equipped with GPS.

According to related aspects, a method for synchronizing wireless nodes in a wireless communication network is provided. The method includes receiving a quality metric related to a surrounding wireless node over a backhaul link. The method further includes selecting the surrounding wireless node for synchronization over one or more disparate surrounding wireless nodes based at least in part on the quality metric and synchronizing timing with the surrounding wireless node.

Another aspect relates to a wireless communications apparatus. The wireless communications apparatus can include at least one processor configured to determine quality metrics corresponding to a plurality of wireless nodes received over a backhaul link. The at least one processor is further configured to select at least one of the plurality of wireless nodes for synchronization based at least in part on its corresponding quality metric and synchronize timing with the at least one wireless node. The wireless communications apparatus also comprises a memory coupled to the at least one processor.

Yet another aspect relates to an apparatus that includes means for receiving quality metrics corresponding to one or more wireless nodes over a backhaul link. The apparatus can additionally include means for selecting at least one of the wireless nodes for synchronization based at least in part on its corresponding quality metric and means for synchronizing timing with the at least one wireless node.

Still another aspect relates to a computer program product, which can have a computer-readable medium including code for causing at least one computer to receive a quality metric related to a surrounding access point over a backhaul link. The computer-readable medium can also comprise code for causing the at least one computer to select the surrounding access point for synchronization over one or more disparate surrounding access points based at least in part on the quality metric. Moreover, the computer-readable medium can comprise code for causing the at least one computer to synchronize timing with the surrounding access point.

Moreover, an additional aspect relates to an apparatus. The apparatus can include a wireless node evaluator that receives a quality metric related to a wireless node over a backhaul link. The apparatus further includes a wireless node selector that selects the wireless node for synchronization over one or more disparate wireless nodes based at least in part on the quality metric and a timing synchronizer that synchronizes timing with the wireless node.

According to another aspect, a method for synchronizing timing in wireless communications is provided. The method includes detecting a timing of a wireless node and a disparate wireless node. The method further includes comparing the timing of the wireless node to that of the disparate wireless node and transmitting a timing correction message to the wireless node based on the comparison.

Another aspect relates to a wireless communications apparatus. The wireless communications apparatus can include at least one processor configured to determine a timing of a wireless node. The at least one processor is further configured to determine a timing of a disparate wireless node and transmit a timing correction message to the wireless node based on the timing of the disparate wireless node. The wireless communications apparatus also comprises a memory coupled to the at least one processor.

Yet another aspect relates to an apparatus that includes means for comparing a timing of a wireless node with a timing of a disparate wireless node and means for transmitting a timing correction message to the disparate wireless node based at least in part on the comparison.

Still another aspect relates to a computer program product, which can have a computer-readable medium including code for causing at least one computer to detect a timing of a wireless node and a disparate wireless node. The computer-readable medium can also comprise code for causing the at least one computer to compare the timing of the wireless node to that of the disparate wireless node. Moreover, the computer-readable medium can comprise code for causing the at least one computer to transmit a timing correction message to the wireless node based on the comparison.

Moreover, an additional aspect relates to an apparatus. The apparatus can include a synch information receiver that obtains a timing of a wireless node and a disparate wireless node. The apparatus further includes a synch information provider that transmits a timing correction message to the wireless node based at least in part on comparing the timing of the wireless node to the timing of the disparate wireless node.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed and this description is intended to include all such aspects and their equivalents.

BRIEF DESCRIPTION OF THE DRAWINGS

FIG. 13 is an illustration of an example system that facilitates synchronizing timing on one or more wireless nodes.

DETAILED DESCRIPTION

Figure 1:
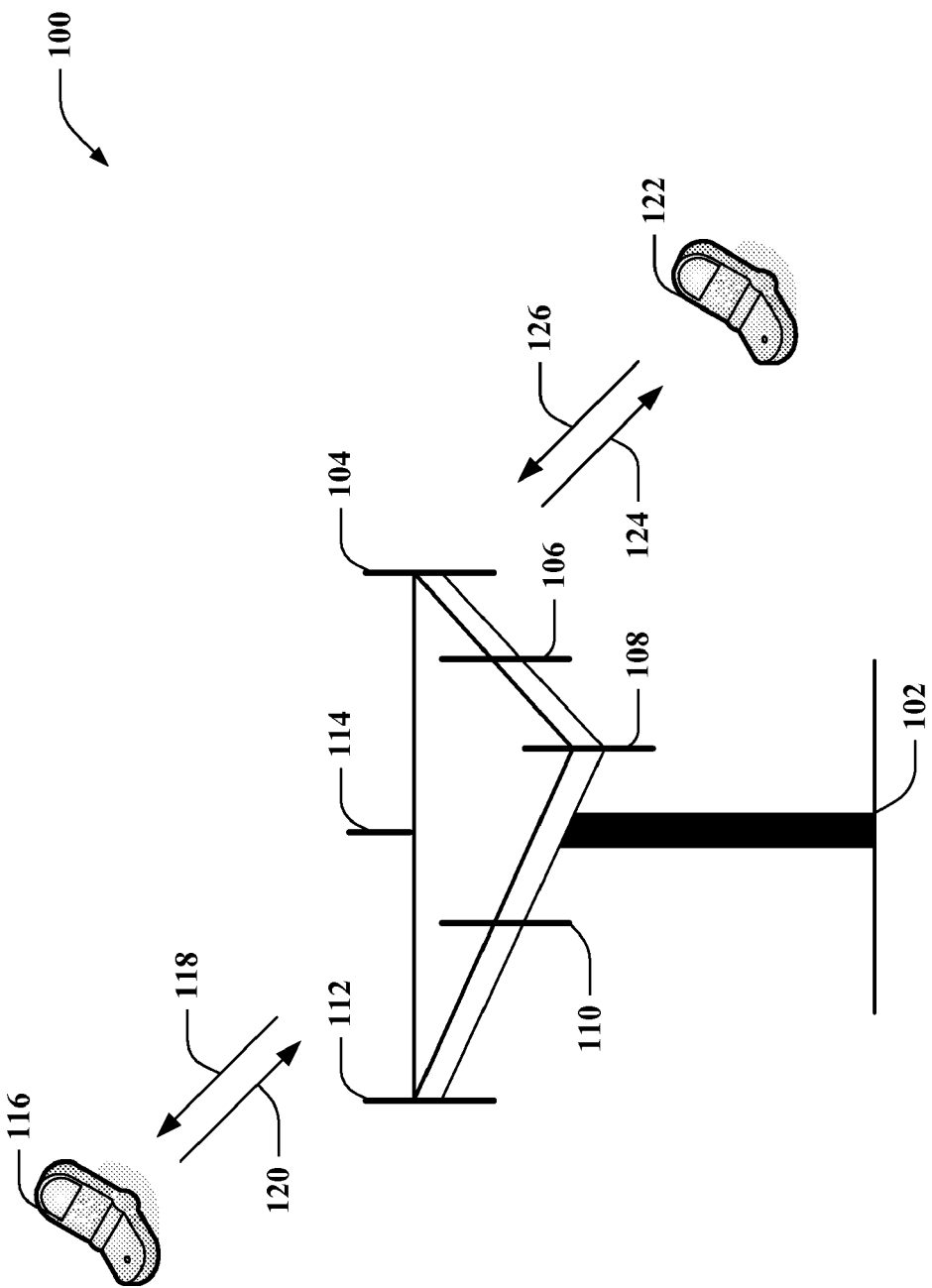
FIG. 1 is an illustration of a wireless communication system in accordance with various aspects set forth herein.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM□, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Referring now to FIG. 1, a wireless communication system 100 is illustrated in accordance with various aspects presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g. processors, modulators, multiplexers, demodulators, demultiplexers, antennas, etc.), as will be appreciated by one skilled in the art.

Base station 102 can communicate with one or more mobile devices such as mobile device 116 and mobile device 122; however, it is to be appreciated that base station 102 can communicate with substantially any number of mobile devices similar to mobile devices 116 and 122. Mobile devices 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, mobile device 116 is in communication with antennas 112 and 114, where antennas 112 and 114 transmit information to mobile device 116 over a forward link 118 and receive information from mobile device 116 over a reverse link 120. Moreover, mobile device 122 is in communication with antennas 104 and 106, where antennas 104 and 106 transmit information to mobile device 122 over a forward link 124 and receive information from mobile device 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

Each group of antennas and/or the area in which they are designated to communicate can be referred to as a sector of base station 102. For example, antenna groups can be designed to communicate to mobile devices in a sector of the areas covered by base station 102. In communication over forward links 118 and 124, the transmitting antennas of base station 102 can utilize beamforming to improve signal-to-noise ratio (SNR) of forward links 118 and 124 for mobile devices 116 and 122. Also, while base station 102 utilizes beamforming to transmit to mobile devices 116 and 122 scattered randomly through an associated coverage, mobile devices in neighboring cells can be subject to less interference as compared to a base station transmitting through a single antenna to all its mobile devices. Moreover, mobile devices 116 and 122 can communicate directly with one another using a peer-to-peer or ad hoc technology (not shown).

According to an example, system 100 can be a multiple-input multiple-output (MIMO) communication system. Further, system 100 can utilize substantially any type of duplexing technique to divide communication channels (e.g., forward link, reverse link, . . . ) such as FDD, FDM, TDD, TDM, CDM, and the like. In addition, communication channels can be orthogonalized to allow simultaneous communication with multiple devices; in one example, OFDM can be utilized in this regard. In any case, the communication techniques utilized can be at least partially time-based such that synchronization among the base station 102 and mobile devices 116 and 122 can facilitate efficient communication. For example, when synchronized with the base station 102, mobile devices 116 and 122 can share common resources based on timing. In addition, synchronization among base stations, such as base station 102 and other base stations (not shown), can be beneficial as well to provide, for example, efficient communication over a related wireless network. It is to be appreciated that base station or access point, as described herein, can relate to a macrocell base station, a femtocell, a mobile base station, a wireless base station, a mobile device operating in a peer-to-peer mode to accept communications from other mobile devices, and/or substantially any access point that provides wireless communications to one or more devices. In addition, such devices can be referred to herein as wireless nodes, which can encompass substantially any wireless communication device.

According to an example, the base station 102 can synchronize to a global positioning system (GPS) for timing if so equipped. It is to be appreciated that though GPS is explicitly mentioned herein, it can refer to substantially any global timing source or satellite-based timing system, terrestrial transmitter based system (e.g., long-range aid to navigation (LORAN), etc.), atomic clock based timing source, another radio access technology, a synchronization signal, terrestrial broadcast signal, and/or substantially any standard source of timing. In another example, as described in further detail below, where the base station 102 is not GPS-equipped, it can synchronize with one or more disparate base stations. The base station 102, in one example, can evaluate surrounding base stations to determine a base station with a high quality metric. The base station 102 can evaluate the surrounding base stations over-the-air (OTA), over a backhaul link, based at least in part on information received from the mobile devices 116 and/or 122 related to disparate base stations, and/or the like. A backhaul link can refer to, for example, one or more communication links between the base station 102 and an underlying wireless network (not shown). The backhaul link can be wired or wireless, for example. In addition, the base station 102 can receive and respond to requests from disparate base stations to synchronize timing where the base station 102 has a desirable quality metric with respect to the disparate base stations, for example. As described in further detail below, the quality metric can be a metric or structure assigned by the wireless network based on one or more aspects of a base station, a measured SNR, and/or the like.

Figure 2:
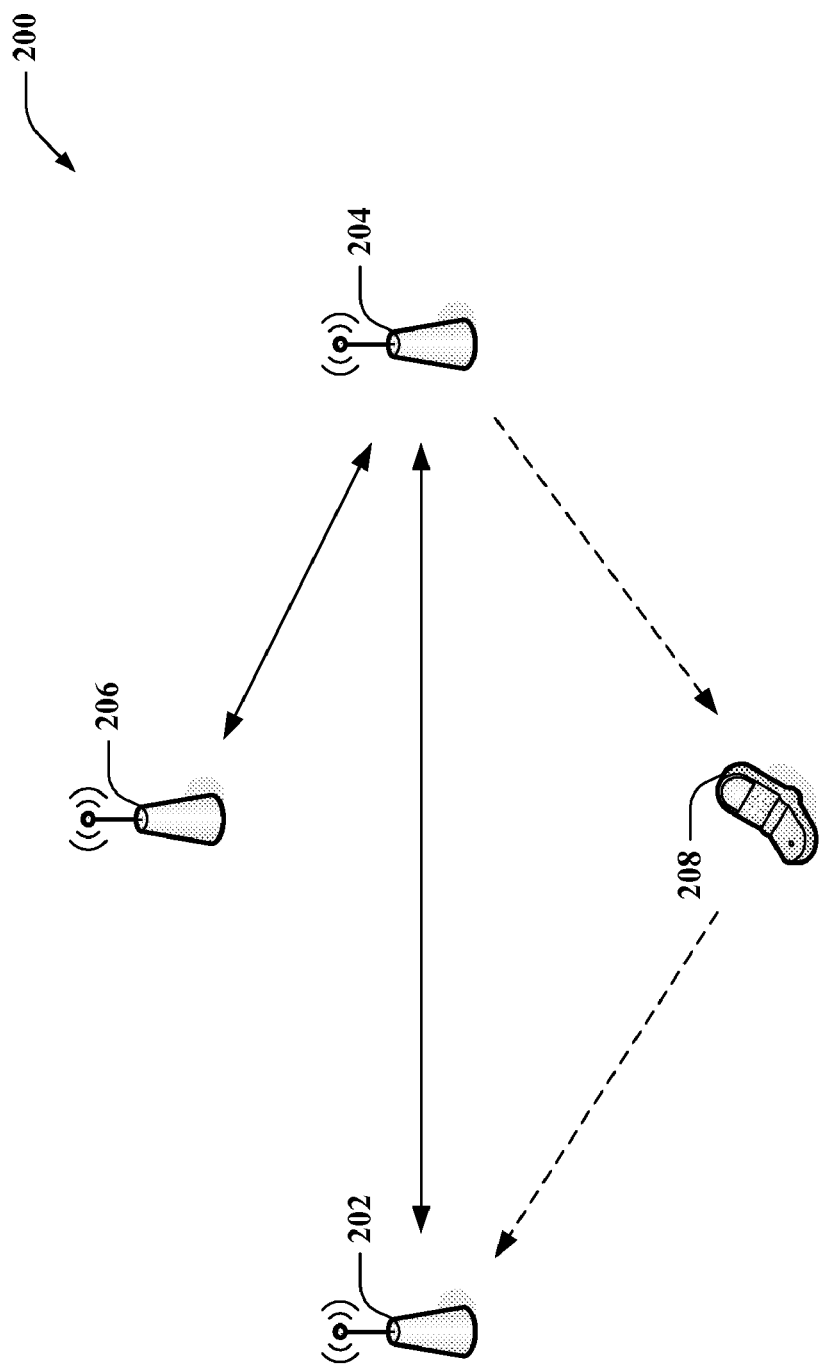
FIG. 2 is an illustration of a wireless communication system that supports timing synchronization among wireless nodes.

Referring now to FIG. 2, an example wireless communication network 200 is shown that facilitates wireless node timing synchronization. The network 200 includes a plurality of wireless nodes 202, 204, and 206. The wireless nodes can be access points, mobile device, and/or substantially any device that communicates with other wireless devices. In one example, wireless nodes 202 and 206 can synchronize timing to wireless node 204. Thus, wireless node 204 can be GPS-equipped, in one example, or can otherwise have a higher quality metric than wireless nodes 202 and 206. As described, the quality metric can relate to one or more aspects of the wireless node and can be received and/or computed by disparate wireless node. For example, the quality metric of wireless node 204 can be a SNR measured by the wireless nodes 202 and 206, and indeed, the SNR of wireless node 204 is higher than wireless node 206 with respect to 202, in this example, otherwise wireless node 202 would synchronize to wireless node 202.

In another example, the quality metric can be specified by an underlying wireless network based at least in part on one or more aspects of the related wireless node. For example, a GPS-equipped wireless node can have a higher quality metric than a non-GPS-equipped wireless node. In addition or alternatively, the quality metric can relate to such factors as an uptime or reliability of a wireless node, a number of devices communicating with the wireless node, a period of time the wireless node has been GPS-equipped, a GPS signal quality, a source of synchronization, number of wireless nodes synchronized, and/or the like. Using quality metrics, the wireless nodes 202, 204, and 206 can form a synchronization tree such that wireless node 204 is the root and wireless nodes 202 and 206 can be child nodes of wireless node 204. It is to be appreciated that wireless node 204 can be synchronized to a disparate wireless node with a higher quality metric, which can then be the tree root, and so on. Likewise, wireless nodes 202 and/or 206 can be utilized by dependent wireless nodes for synchronization, which become child nodes expanding the lower levels of the tree, and so on.

According to an example, wireless node 202, upon powering up, resetting, or other initialization, can discover wireless nodes 204 and/or 206 for synchronization. Discovery can include detecting the wireless nodes 204 and/or 206 via OTA signaling (e.g., analyzing a superframe preamble, etc.), backhaul link, and/or the like. In another example, the wireless node can utilize a mobile device 208, or other device (such as a disparate wireless node) to receive information regarding wireless node 204 (and/or 206, though not shown), such as signal strength, timing offset, and/or the like. Thus, the mobile device 208 can act as a gateway, in this regard, to synchronize wireless node 202 with wireless node 204 or provide information related to the synchronization. Once the wireless node 202 discovers the disparate wireless nodes 204 and/or 206, it can receive a quality metric related to the wireless nodes 204 and/or 206, as described. It is to be appreciated that the wireless node 202 can receive the quality metric as part of discovery, in one example. In addition, the quality metric can similarly be received OTA or over a backhaul link from the wireless node 204 and/or 206 or underlying network component, etc. As indicated, in the depicted example, the wireless node 204 can have a higher quality metric with respect to wireless node 202 than wireless node 206; thus, the wireless node 202 can select wireless node 204 for synchronization.

Wireless node 202 can synchronize with wireless node 204 OTA or over a backhaul link, as described; in one example, timing can be acquired from the wireless node 204 using similar mechanisms as a mobile device. In another example, as mentioned, the mobile device 208 can act as a gateway to facilitate such synchronization where the wireless node 202 cannot effectively communicate with the wireless node 204 for one or more reasons (e.g., bad connection, high interference, backhaul link failure, cannot communicate with other wireless nodes, etc.) or otherwise. In this regard, the mobile device 208, or another device (such as a base station or other wireless node in the wireless network), can transmit a timing correction message to the wireless node 202. In one example, the mobile device 208 can transmit the correction message based on evaluating the timing of the access point 202 and access point 204 and detecting a disparity among the timings. The timing correction message can comprise a timing of the access point 204, a difference in timing, and/or other timing information related to synchronizing with the access point 204, in one example.

In addition, wireless node 202 can maintain synchronization after initial establishment. In this regard, the wireless node 202 can continue to receive and evaluate quality metrics for surrounding wireless nodes, such as wireless nodes 204 and/or 206. For example, where wireless node 204 is initially GPS-equipped, it can lose GPS signal, shutdown, reset, etc., in which case its quality metric can be modified. The wireless node 202 can synchronize with wireless node 206 or a disparate wireless node in this case if wireless node 204 is down or no longer has the highest quality metric of the discovered wireless nodes. In one example, the wireless node 202 can become a root node where no surround wireless nodes have a higher quality metric than the wireless node 202 (e.g., and wireless node 206 can synchronize to wireless node 202). In yet another example, if a new wireless node (not shown) powers up after wireless node 202 is synchronized to wireless node 204, and the new wireless node has a higher quality metric, wireless node 202 can synchronize to the new wireless node instead as part of maintaining synchronization.

In another example, the wireless nodes 204 and 206 can specify a root parameter (e.g., with the quality metric or otherwise) indicating the root node of the respective tree. The wireless node 202 can evaluate the root nodes of wireless nodes 204 and/or 206 during maintaining synchronization as well as other nodes along the path to prevent synchronizing with a node causing a synchronization loop. Furthermore, it is to be appreciated that ordering synchronization using the quality metric can prevent frequent hopping (e.g., ping-ponging effect) between synchronizations where other wireless nodes appear. The quality metric can allow for priority based wireless node selection such that nodes can select synchronization nodes having the highest quality metric allowing tree formation.

Figure 3:
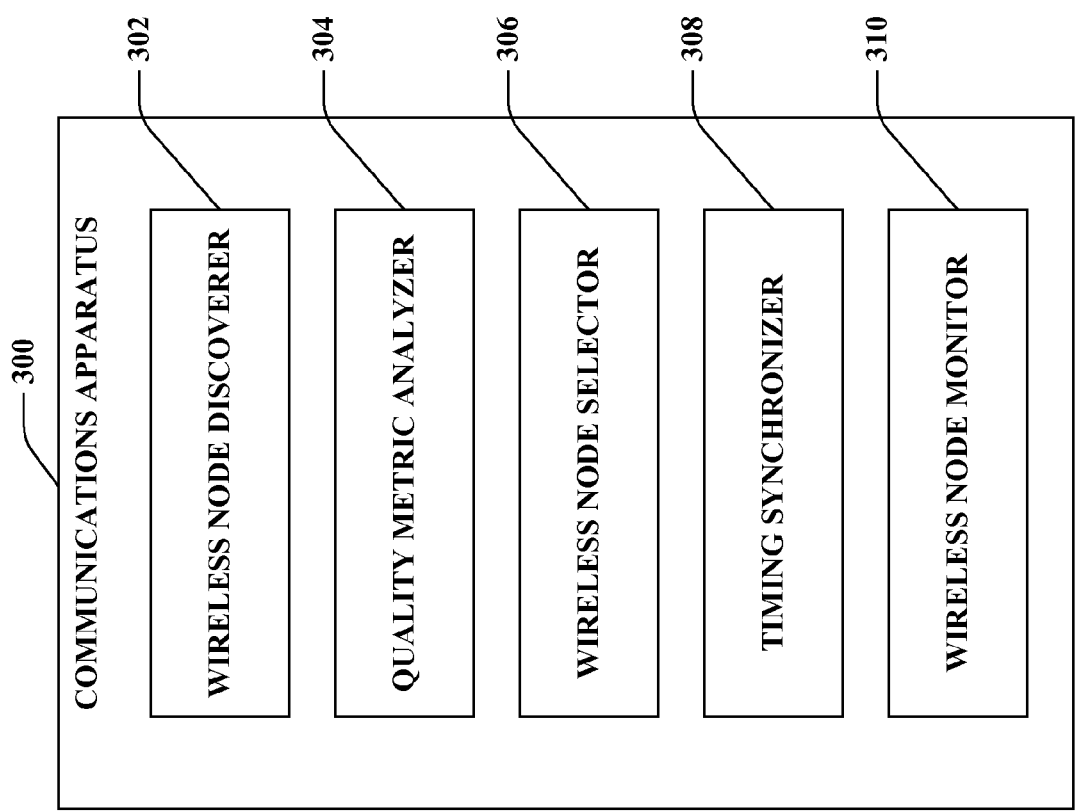
FIG. 3 is an illustration of an example communications apparatus for employment within a wireless communications environment.

Turning to FIG. 3, illustrated is a communications apparatus 300 for employment within a wireless communications environment. The communications apparatus 300 can be a base station or a portion thereof, a mobile device or a portion thereof, or substantially any communications apparatus communicates over a wireless network. The communications apparatus 300 can include a wireless node discoverer 302 that can detect presence of one or more surrounding wireless nodes, a quality metric analyzer 304 that can receive and evaluate one or more quality metrics related to at least one of the surrounding wireless nodes, a wireless node selector 306 that can determine a wireless node for timing synchronization based at least in part on the related quality metric(s), a timing synchronizer 308 that can adjust timing of the communications apparatus 300 to substantially match that of the wireless node, and a wireless node monitor 310 that can continually evaluate surrounding wireless nodes to ensure the communications apparatus 300 is synchronized to the wireless node with the highest quality metric.

According to an example, the communications apparatus 300 can require or desire timing synchronization with one or more wireless nodes to operate in a synchronous wireless network. The communications apparatus 300 can synchronize to GPS if so equipped. The communications apparatus 300 can additionally or alternatively synchronize timing with one or more disparate wireless nodes in the wireless network. To this end, wireless node discoverer 302 can determine presence of surrounding wireless nodes to which the communications apparatus 300 can synchronize timing. As described, the wireless node discoverer 302 can detect the surrounding wireless nodes using OTA signaling (e.g., using similar mechanisms as mobile devices), a backhaul link, information from an underlying network component, and/or the like. In addition, as described, the wireless node discoverer 302 can communicate with a mobile device to receive information regarding surrounding wireless nodes, such as signal strength, timing offset, and/or the like.

In addition, the quality metric analyzer 304 can receive at least one quality metric related to one or more of the surrounding wireless nodes. In one example, the quality metric can be received during wireless node discovery or later requested by the quality metric analyzer 304 OTA, via backhaul link, and/or the like, as described. The quality metric can be measured by the quality metric analyzer 304, such as an SNR related to communicating with the surrounding wireless nodes. The quality metric can also be calculated and assigned to the surrounding wireless node based on various factors, such as uptime of the wireless node, uptime of a related GPS device, signal strength of the GPS signals, number of wireless nodes synchronized, etc., and/or the like. According to another example, the quality metric can be stored in a synchronization structure related to the wireless nodes. In one example, the synchronization structure can be received by the wireless node discoverer 302, and the quality metric analyzer 304 can determine the quality metric along with other related metrics in the synchronization structure.

It is to be appreciated that the structure can vary for a GPS-equipped wireless node as opposed to a wireless node not so equipped, for instance. In one example, the synchronization structure for a GPS-equipped wireless node can be formatted as follows:

| Field | Size |
|---|---|
| Type | 1 |
| Quality | 64 |
| Hop Count | 8 | where the type represents whether or not the wireless node is GPS-equipped, the quality relates to quality metric, and the hop count specifies a number of wireless nodes between the related wireless node and a root in the tree. In the case of a GPS-equipped wireless node, for example, the hop count can typically be zero as the GPS-equipped wireless node can synchronize to GPS in most cases. A synchronization structure for a wireless node not equipped with GPS can be formatted as follows, in one example.

| Field | Size |
|---|---|
| Type | 1 |
| Quality | 64 |
| RootANID | 64 |
| Hop Count | 8 | where the type represents whether or not the wireless node is GPS-equipped, the quality relates to quality metric, the root access node identifier (RootANID) relates to the wireless node that is the root of the tree (which can be synchronized to GPS, in one example), and the hop count specifies a number of wireless nodes between the related wireless node and the root. The above formats are just one example of the synchronization structure.

The wireless node selector 306 can evaluate quality metrics and/or parameters in the structure, as determined by the quality metric analyzer 304 for the surrounding wireless nodes, to select a candidate node for synchronization. For example, the wireless node selector 306 can compare the quality metrics to determine a highest metric and choose the corresponding wireless node for synchronization. The wireless node selector 306 can also compare the quality metrics to quality metrics related to the communications apparatus 300 to ensure the communications apparatus 300 should synchronize with another wireless node—where the communications apparatus 300 has higher quality metrics than substantially all surrounding wireless nodes, for example, it can be the root node. In addition, as described, where the communications apparatus 300 is GPS-equipped, it can synchronize timing with its GPS and be a root node. In an example, the wireless node selector 306 can evaluate parameters of a synchronization structure in conjunction. Thus, for example, the wireless node selector 306 can evaluate the quality metric of a wireless node not equipped with GPS along with the hop count to determine whether to select the wireless node. The wireless node selector 306 can determine that a disparate wireless node with a lower quality metric but also lower hop count is a more desirable selection.

Once the wireless node selector 306 determines a wireless node, the timing synchronizer 308 can adjust timing of the communications apparatus 300 to substantially match the selected wireless node. The timing can relate to, for example, actual time based on a GPS, timeslot and/or frame numbering, and/or the like. In one example, this can be performed using similar mechanisms as mobile devices to perform synchronization and/or acquisition with wireless nodes (e.g. evaluating pilot signals, system information blocks, utilizing a common channel configuration, such as a random access channel (RACH), and/or the like). In addition, the timing synchronizer 308 can synchronize with the selected wireless node based at least in part on messages from mobile devices connected to the selected wireless node, as described, relay stations, etc. The timing synchronizer 308 can adjust the timing of the communications apparatus 300, for example, by slewing the time gradually to meet the wireless node, by adjusting the time in one procedure, and/or the like. The wireless node monitor 310 can continually monitor surrounding wireless nodes to determine whether candidates with higher quality metrics exist for synchronizing.

According to an example, the wireless node monitor 310 can continue to receive information related to surrounding wireless nodes like the wireless node discoverer 302; in fact, the wireless node monitor 310 can utilize the wireless node discoverer 302 to facilitate this functionality. The wireless node monitor 310 can additionally utilize the quality metric analyzer 304 to receive and/or determine quality metrics related to the surrounding wireless nodes, as described. Where wireless nodes appear with more desirable metrics than a wireless node currently connected for synchronization (and/or the current wireless node loses GPS signal, fails, resets, or otherwise becomes inaccessible), the wireless node selector 306 can be utilized to select a new surrounding wireless node for synchronization, and the timing synchronizer 308 can accordingly adjust the timing of the communications apparatus 300, as described.

It is to be appreciated, in one example, that the current wireless node with which timing is synchronized can fail, and the wireless node monitor 310 does not detect additional wireless nodes with a threshold or desired quality metric. In this case, the communications apparatus can become a root node. In another example, where additional wireless nodes are detected, the wireless node monitor 310 can evaluate a RootANID of synchronization structures related to the newly discovered wireless nodes, if not GPS-equipped for example, to ensure they do not have the same root. If so, the wireless node selector 306 can choose other wireless nodes that meet the desired quality metrics; if none exist, as mentioned, the communications apparatus 300 can become a root node in the synchronization tree. This prevents cyclic synchronization within the tree, for example. In addition, similarly to the initialization procedure described above, the wireless node monitor 310 can prefer synchronization with GPS-equipped wireless nodes, wireless nodes with higher quality metrics, lower hop counts, etc.

According to an example described above, where the quality metric relates to an SNR measured by the quality metric analyzer 304, the wireless node selector 306 can decide to synchronize to the wireless node with the highest SNR. This can be regardless of whether the wireless node has GPS. Thus, the synchronization tree can form where the root node has the highest SNR. In this regard, even if the communications apparatus 300 is GPS-equipped, it can become a child of a higher SNR wireless node for synchronization purposes. In fact, where the communications apparatus is GPS-equipped, the timing synchronizer 308 can send a synchronization command to the higher SNR wireless node and/or the root node such that those wireless nodes can be GPS synchronized though they may not be GPS-equipped, in one example.

Figure 4:
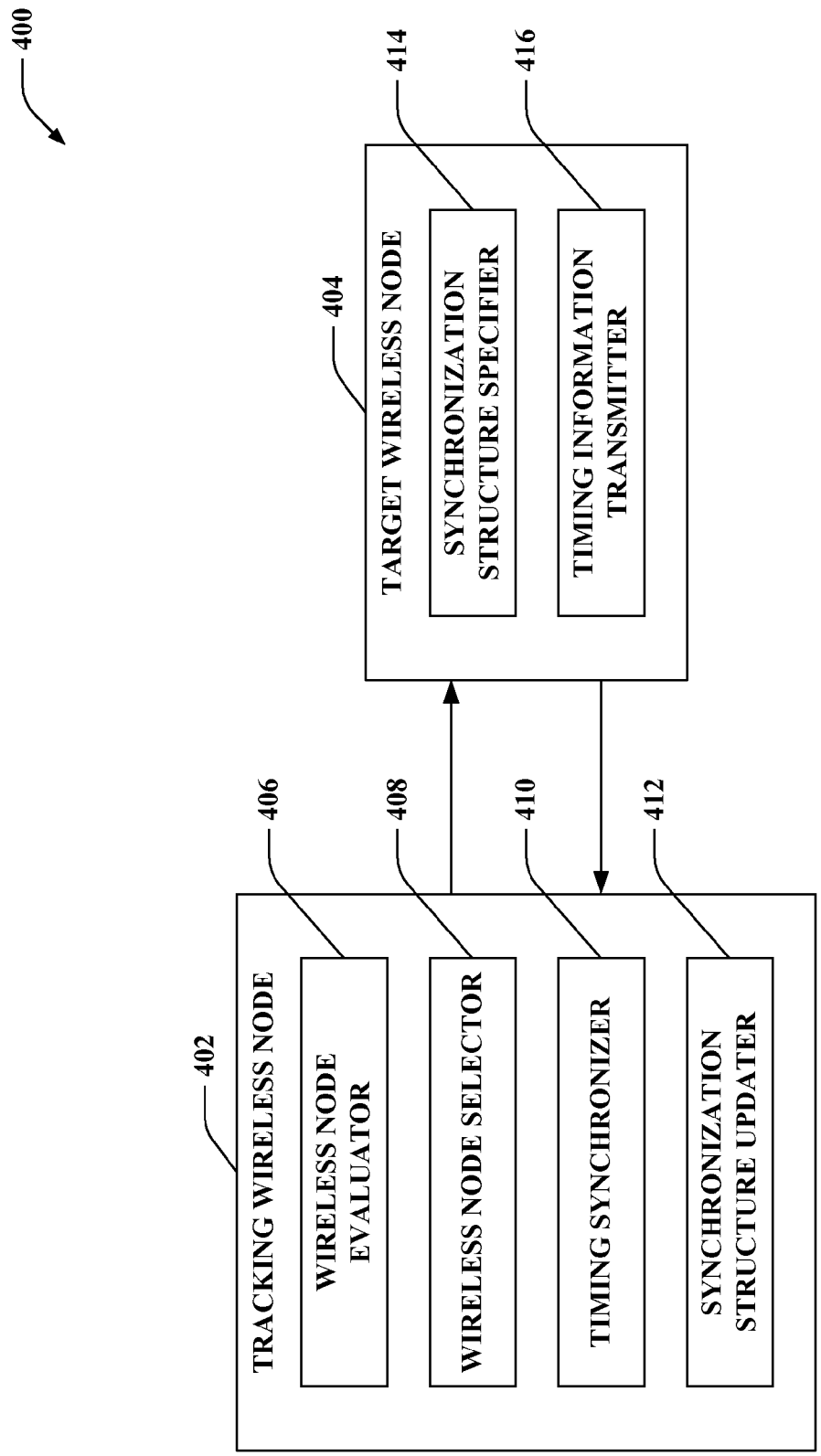
FIG. 4 is an illustration of an example wireless communications system that effectuates timing synchronization among wireless nodes.

Now referring to FIG. 4, illustrated is a wireless communications system 400 that facilitates synchronizing wireless node timing. Tracking wireless node 402 and/or target wireless node 404 can be a mobile device (including not only independently powered devices, but also modems, for example), a base station, and/or portion thereof, or substantially any wireless device. Moreover, system 400 can be a MIMO system and/or can conform to one or more wireless network system specifications (e.g., EV-DO, 3GPP, 3GPP2, 3GPP LTE, WiMAX, etc.). Also, the components and functionalities shown and described below in the tracking wireless node 402 can be present in the target wireless node 404 as well and vice versa, in one example; the configuration depicted excludes these components for ease of explanation.

Tracking wireless node 402 includes a wireless node evaluator 406 that can discover and receive timing information regarding one or more surround wireless nodes, such as target wireless node 404, a wireless node selector 408 that can determine a wireless node with which to synchronize timing, a timing synchronizer 410 that can adjust the timing of the tracking wireless node according to the determination, and a synchronization structure updater 412 that can modify a synchronization structure or other quality metric related to the tracking wireless node 402 to reflect the timing synchronization. The target wireless node 404 can include a synchronization structure specifier 414 that can transmit a synchronization structure or other quality parameter to one or more wireless nodes, such as tracking wireless node 402 and a timing information transmitter 416 that can broadcast information related to timing of the target wireless node 404. This can be, for example, system acquisition information regarding a common channel, such as a RACH, pilot signals with frame preambles, and/or the like.

According to an example, the wireless node evaluator 406 can determine quality metrics and/or synchronization structures related to one or more surrounding wireless nodes, such as target wireless node 404. In one example, the wireless node evaluator 406 can receive this information from the synchronization structure specifier 414 or other component of the target wireless node 404 that transmits the structure (e.g., OTA, backhaul link, using one or more devices as a gateway, etc.). The synchronization structure can be a quality metric or a structure including the quality metric, such as the structure format described in reference to previous figures, in one example. The wireless node selector 408 can compare the synchronization structure or quality metric with those received from disparate wireless nodes to determine a wireless node for timing synchronization. In the depicted example, wireless node selector 408 can choose target wireless node 404 for synchronization. In this regard, timing synchronizer 410 can adjust timing of the tracking wireless node 402 based on timing parameters received from timing information transmitter 416. This can be performed OTA, using a backhaul, utilizing a mobile device as a gateway, and/or the like, as shown supra. As described, timing synchronizer 410 can slew the timing to gradually adjust over a period of time and/or can perform an instant synchronization. Upon synchronizing to a wireless node, the tracking wireless node 402 can become part of a synchronization tree and can have disparate tracking wireless nodes (not shown) depend on it for timing synchronization.

In one example, as described, the wireless node selector 408 can compare measured quality metrics, such as SNR, for various wireless nodes in determining a wireless node for timing synchronization. In this example, the wireless node with the highest SNR can be the root node such that substantially all in-range surrounding wireless nodes can synchronize to the root node, as described. However, in this example, the root node need not be GPS-equipped. For example, the target wireless node 404 can be the root node in this example. Where the target wireless node 404 is not GPS-equipped and the tracking wireless node 402 is GPS-equipped, the timing synchronizer 410 can transmit timing synchronization information (e.g., a synchronization signal) to the target wireless node 404 allowing the target wireless node 404 to synchronize to the tracking wireless node.

In another example, the wireless node selector 408 can compare synchronization structure parameters, such as quality metric, hop count, RootANID, access node identifier for an entire path of the synchronization tree from the target wireless node 404 to the root node, the synchronization source (e.g., GPS, an access point, mobile device, etc.) whether the wireless node is GPS-equipped, and/or the like, in determining a wireless node for synchronization. As described, for example, the wireless node selector 408 can ensure that a selected wireless node for synchronization does not have the same RootANID as the tracking wireless node 402 to prevent cycles in the synchronization tree. The wireless node selector 408 can also compare a quality metric, hop count, and/or the like of the tracking wireless node 402 to those of surrounding wireless nodes to ensure it does not select a wireless node having a lower quality metric for synchronization, in one example. Thus, in this example, the target wireless node 404 can have a higher quality metric than tracking wireless node 402 and/or other surrounding wireless nodes resulting in selection by the wireless node selector 408. In this regard, a strict priority can be enforced based on the quality metric with respect to selecting wireless nodes for synchronization, for instance. In addition, for example, the hop count can be evaluated in selecting between wireless nodes that have the same or similar quality metric. In another example, the target wireless node 404 can be a root node in a synchronization tree, as described.

According to an example, the tracking wireless node 402 can synchronize timing to the target wireless node 404, as described, and the target wireless node 404 can experience a change in quality metric. For example, the target wireless node 404 can fail, reset, lose or experience degradation of a GPS signal, and/or the like, which can cause its quality metric to decrease in value. The wireless node evaluator 406 can continually monitor the target wireless node 404 and other surrounding wireless nodes for such changes in quality metric to ensure it synchronizes with a desirable candidate wireless node. Thus, the quality metric of the target wireless node 404 can decrease causing the wireless node selector 408 to choose another wireless node for timing synchronization if a wireless node having a higher quality metric exists. In addition, however, one or more surrounding wireless nodes can appear with a higher quality metric than the target wireless node 404 (e.g., from presence of a new or revived wireless node, increase or acquisition of a GPS signal, and/or the like). In this case as well, the wireless node selector 408 can detect and select the surrounding wireless node for synchronization. Likewise, following an increase in quality metric that results in the target wireless node 404 being the wireless node with the highest quality metric or otherwise more desirable synchronization structure parameters, the wireless node selector 408 can reselect the target wireless node 404 for timing synchronization.

According to yet another example, changes on the tracking wireless node 402 can affect timing synchronization. For example, the tracking wireless node 402 can acquire GPS functionality or otherwise discover a GPS signal. The quality metric of the tracking wireless node 402 can be increased above the target wireless node 404, in one example, such that the tracking wireless node 402 synchronizes to itself using the GPS signal or the other GPS-equipped wireless node. In one example, though not shown, the target wireless node 404 can behave as a tracking wireless node upon occurrence of the increase in quality metric for the tracking wireless node 402 and can synchronize timing to the tracking wireless node 402, as described above. It is to be appreciated that the tracking wireless node 402 and/or surrounding wireless nodes can substantially silence communication in a common time period to search for desirable target wireless nodes for timing synchronization, in one example.

Figure 5:
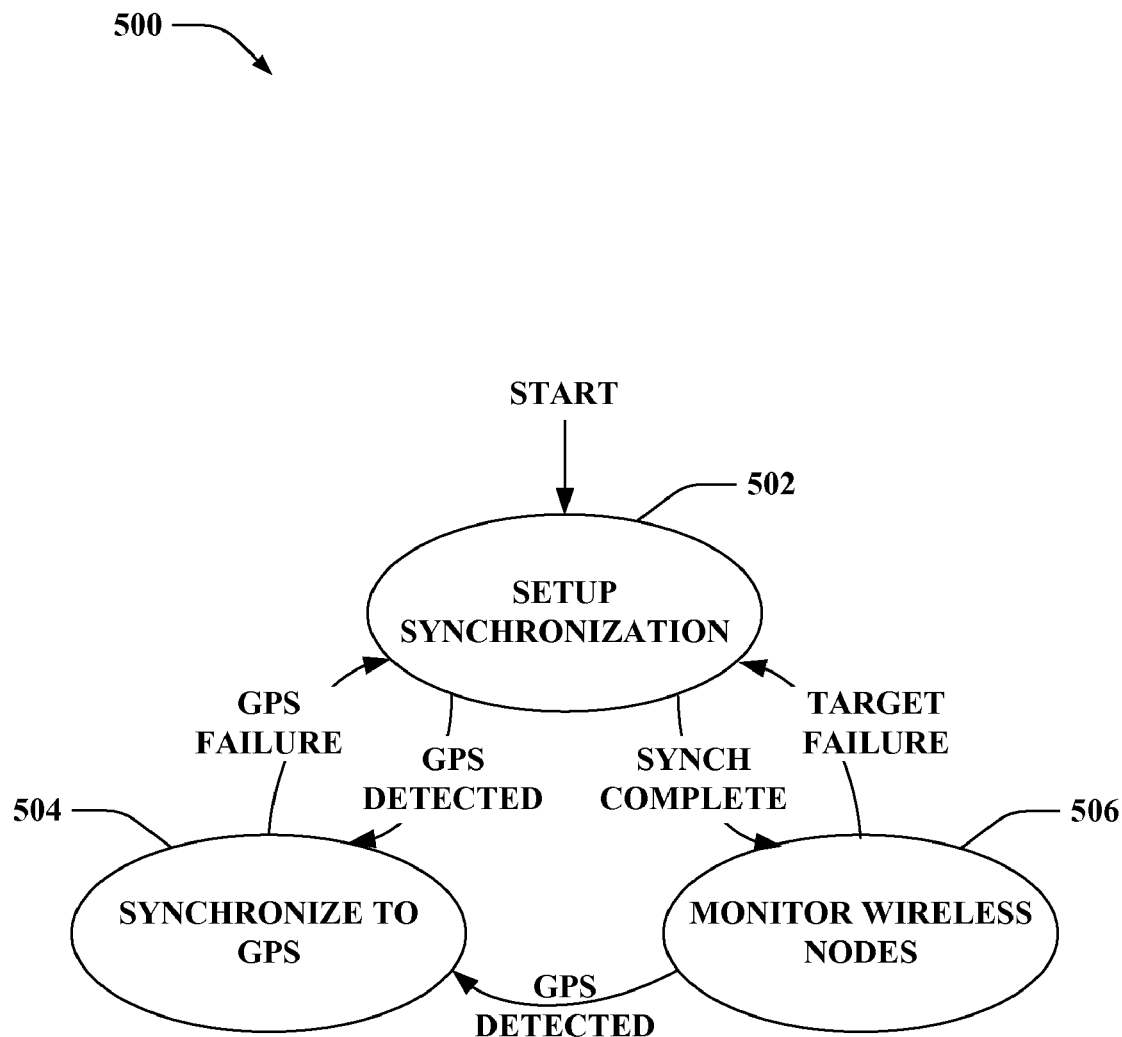
FIG. 5 is an illustration of an example state diagram of tracking wireless nodes synchronizing timing with global positioning system (GPS) or target wireless nodes.

Turning now to FIG. 5, an example state diagram 500 is displayed that shows tracking wireless node states and related transition events. The state diagram begins at setting up timing synchronization 502 with one or more wireless nodes. Such setup can occur, as described, by receiving quality metrics for one or more target wireless nodes OTA, over a backhaul link, etc. The quality metrics can relate to SNR, synchronization structures or related parameters, uptime of a wireless node, strength of a GPS signal, and/or the like, as described previously. If a GPS signal is detected at the tracking wireless node, however, such setup is not necessary, and the tracking wireless node can enter synchronize to GPS state 504 where the tracking wireless node adjusts its timing to meet that of the GPS. In this state 504, the tracking wireless node can maintain synchronization with the GPS by continually monitoring the timings for disparity, for example. In addition, the tracking wireless node can set its synchronization parameters to reflect the GPS synchronization (e.g., GPS=true, target node=NULL, hop count=0, etc.). Thus, other tracking wireless nodes can utilize this information to determine whether to synchronize timing with the tracking wireless node of this example. In one example, the tracking wireless node can be a root node and can set a root node synchronization structure parameter to its own identifier.

If the GPS fails (e.g., the signal becomes obstructed, the device itself fails), the setup synchronization state 502 can be entered to locate a target wireless node for timing synchronization, as described above. In an example, described above, the target wireless node can be selected from a group of wireless nodes by evaluating one or more quality metrics related thereto. For example, the tracking wireless node can select a target node that is GPS-equipped. If more than one exists, the target node having the earliest time, highest quality metric, and/or smallest hop count can be selected. If no target nodes are GPS-equipped, the tracking wireless node can select one or more target nodes with a highest quality metric. If more than one has the same highest quality metric, the target wireless node, for example, can select one or more with the highest node identifier and/or smallest hop count. If not, the target wireless node, in one example, can select the target node with the smallest hop count. Once a node is selected, timing can be synchronized, as shown supra. In addition, the tracking wireless node can set its synchronization parameters to reflect the target node synchronization (e.g., GPS=false, target node=identifier of target node, root node=root node of target node, quality metric=quality metric of target node, hop count=hop count of target node+1, etc.). Thus, other tracking wireless nodes can utilize this information to determine whether to synchronize timing with the tracking wireless node of this example. If no target nodes can be located, the tracking wireless node can be a root node in this case as well, as described above (e.g., the example parameters shown above can be GPS=false, target node=tracking node identifier, hop count=0, etc.).

When synchronization is complete, the tracking wireless node can move to the monitor wireless nodes state 506, where target wireless nodes will be continually monitored and evaluated for higher quality metrics. If wireless nodes are detected with higher quality metrics, the tracking wireless node can synchronize to those nodes instead, as shown above, reset synchronization structure parameters or quality metrics, if applicable, and remain in the monitor wireless nodes state 506. Where the higher quality metric node is the current target node, the tracking wireless node can increase its quality metric to match, for example. If, however, a target node utilized for synchronization fails, the tracking wireless node can enter the setup synchronization state 502 to locate another target wireless node for timing synchronization. In addition, while in the monitor wireless nodes state 506, the tracking wireless node can additionally monitor for a GPS signal. If such is detected (e.g., GPS comes back online after failure resulting in synchronizing with the target wireless node), the tracking wireless node can enter synchronize to GPS state 504, as described above.

Figure 6:
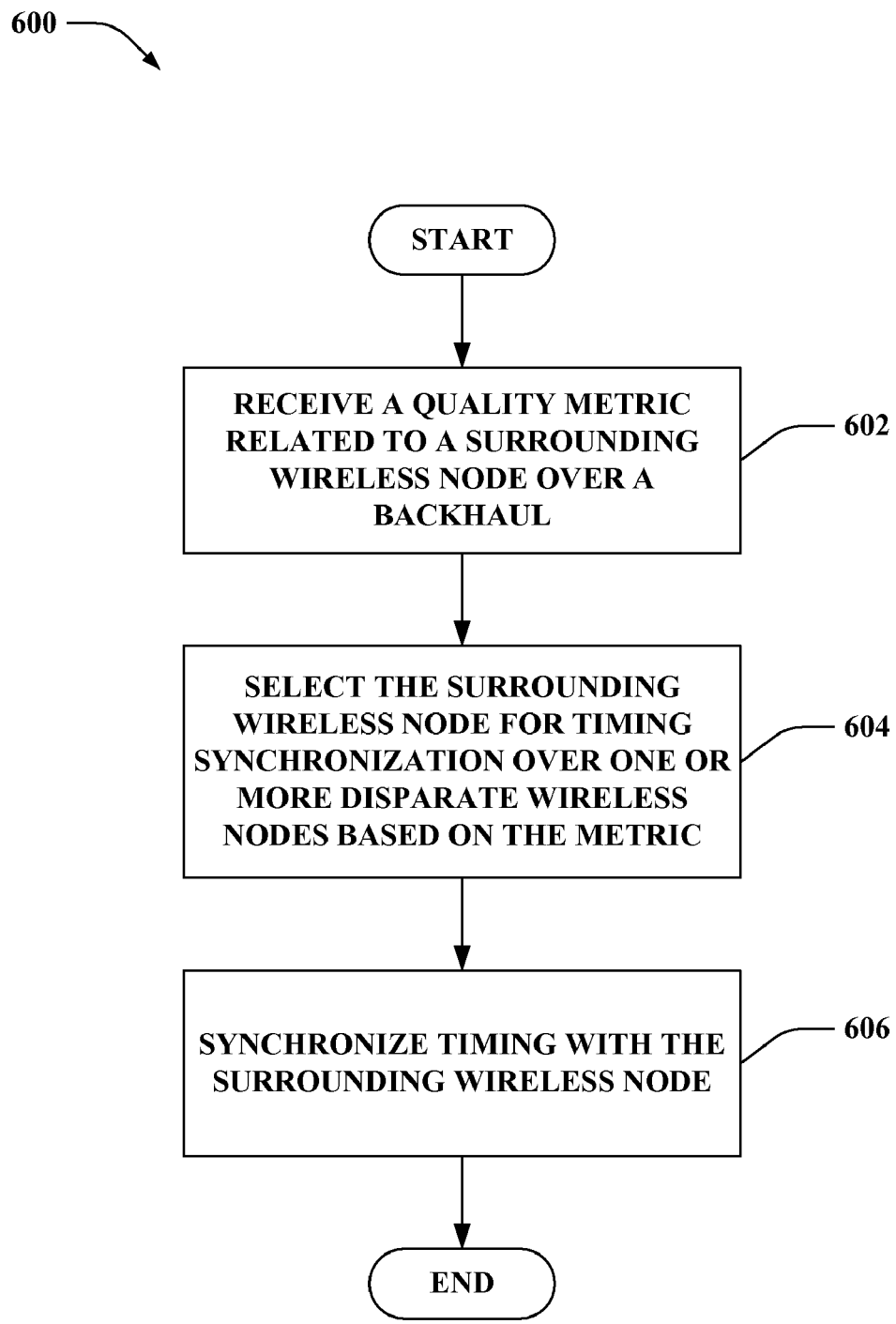
FIG. 6 is an illustration of an example methodology that facilitates synchronizing timing with a selected wireless node based on one or more related quality metrics.
Figure 7:
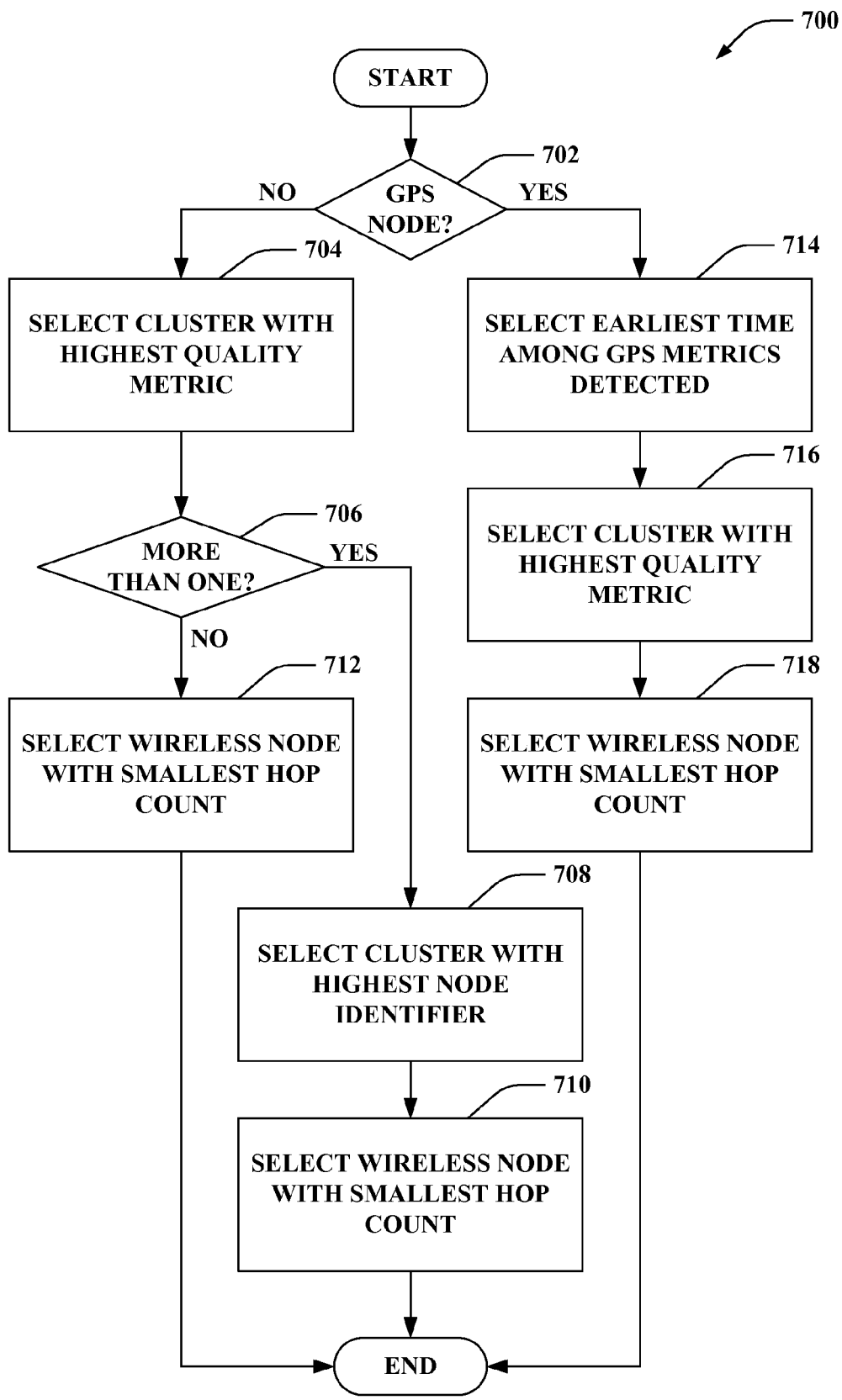
FIG. 7 is an illustration of an example methodology that facilitates selecting a wireless node for timing synchronization.
Figure 8:
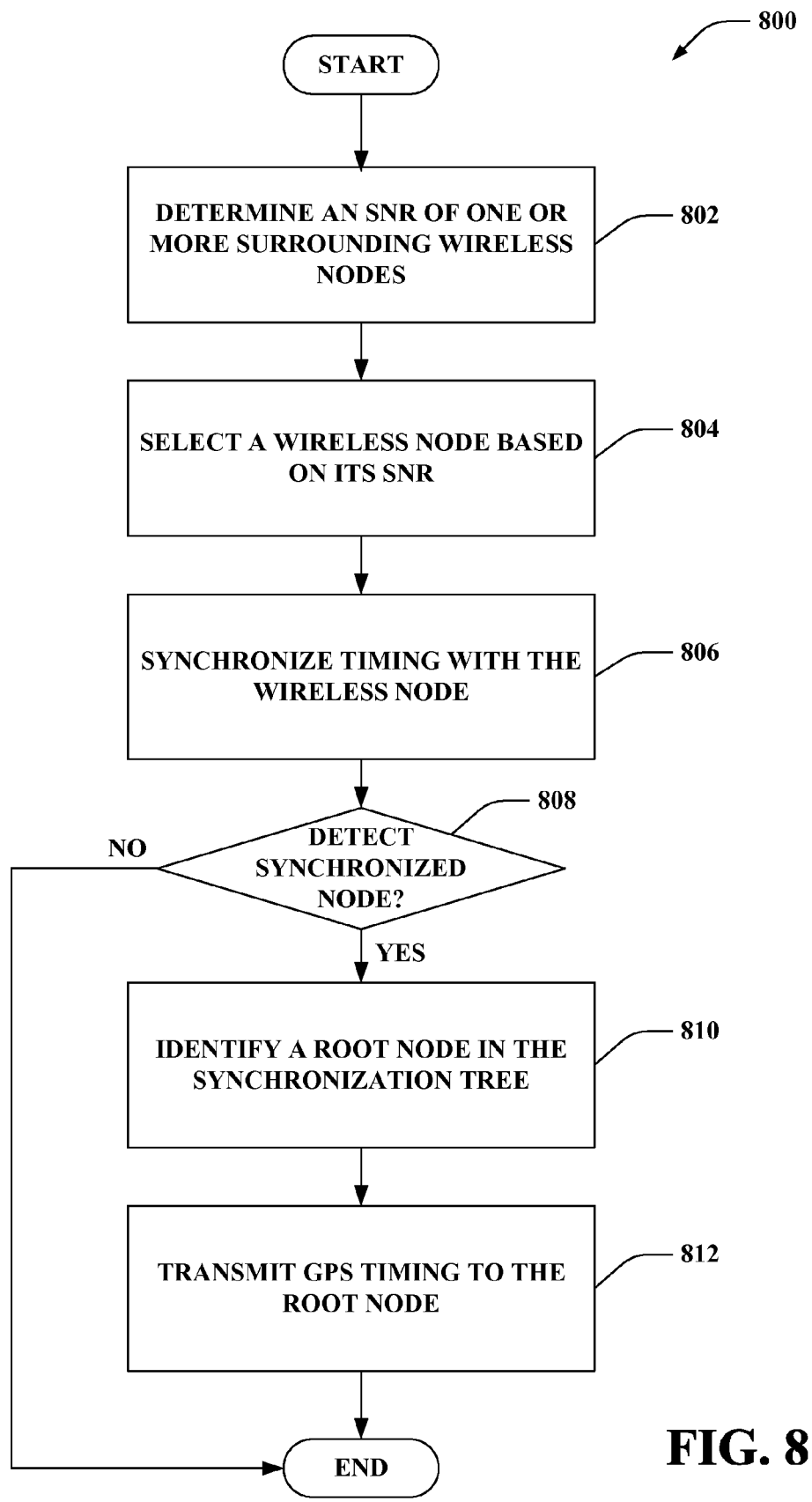
FIG. 8 is an illustration of an example methodology that facilitates synchronizing timing with a wireless node based on signal-to-noise ratio (SNR).

Referring to FIGS. 6-8, methodologies relating to synchronizing timing among wireless nodes in wireless communication networks are illustrated. While, for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

Turning to FIG. 6, an example methodology 600 that facilitates selecting wireless nodes for synchronization in wireless networks is displayed. At 602, a quality metric related to a surrounding wireless node is received over a backhaul. As described, the quality metric can be utilized as a priority for selecting wireless nodes, in one example, such that the wireless node having the highest quality is selected for synchronization. The quality metric can relate to whether the wireless node is GPS-equipped, GPS signal strength, uptime, quality of timing source, a combination thereof, and/or the like, for example. At 604, the surrounding wireless node can be selected for timing synchronization over one or more disparate wireless nodes based on the metric. Thus, as described, the wireless node with the most desirable metric(s) can be selected. As shown above, the metric can also relate to one or more parameters in a synchronization structure (e.g., root node, target node, hop count, etc.), which can be evaluated in conjunction, in one example. At 606, timing can be synchronized with the surrounding wireless node, which can include slewing the time, setting the time in one adjustment, and/or the like.

Referring to FIG. 7, an example methodology 700 is shown that facilitates selecting wireless nodes for timing synchronization. At 702, it is determined whether GPS-equipped nodes are detected; GPS-equipped nodes, as described previously, can be synchronized to timing of a GPS. If there are no GPS nodes detected, at 704, a cluster of nodes with a highest quality metric can be selected. The cluster can include one or more wireless nodes having a similar root node, in one example. As described, the quality metric can relate to SNR, GPS ability, GPS signal strength, uptime, quality of timing source, synchronization structure parameters, etc. In addition, the quality metric can be specified by the wireless node, acquired OTA from other devices, received over a backhaul link to one or more network components, and/or the like. At 706, it is determined whether more than one cluster exists with the highest quality metric. If so, at 708, the cluster with the highest node identifier can be selected, and at 710, the wireless node with the smallest hop count in the cluster can be selected.

Where there is only one cluster with the highest quality metric at 706, at 712, the wireless node with the smallest hop count in the cluster can be selected. Where GPS-equipped nodes are detected at 702, the cluster having the earliest time among the other GPS metrics detected can be selected at 714. At 716, the cluster with the highest quality metric can be selected from the clusters having the earliest GPS time. At 718, the wireless node in the cluster with the smallest hop count can be selected for synchronization. It is to be appreciated that where more than one node has the same hop count in the examples above, other metrics can be evaluated to determine which wireless node to select for timing synchronization. In addition, this is just one example of selecting one wireless node over others. It is to be appreciated that many other examples are possible based on quality metrics described herein.

Turning to FIG. 8, illustrated is an example methodology 800 that facilitates utilizing SNR to synchronize timing a wireless node. At 802, an SNR of one or more surrounding wireless nodes can be determined. This can be computed and/or received, in one example, as described. At 804, a wireless node can be selected for timing synchronization based on its SNR. At 806, timing can be synchronized with the wireless node. This can include, for example, slewing timing to match the wireless node over a span of time, synchronizing timing in one adjustment, and/or the like, as described. Moreover, as shown above, the wireless node can be a node in a synchronization tree having a root node and a plurality of nodes that synchronize timing with the root node and/or one or more associated child nodes. In one example, the selected wireless node can be the root node.

At 808, it is determined whether a synchronized node is detected. If so, the root node of the synchronization tree can be identified at 810. In one example, the wireless node can indicate the root node in a transmitted synchronization structure or otherwise. At 812, GPS timing (e.g., from the synchronized node) can be transmitted to the root node to synchronize the root node with GPS. In this example, the root node of the synchronization tree can have the highest SNR of nodes in the tree. The root node can maintain its own timing, maintain timing with GPS where it is GPS-equipped, and/or receive GPS timing from one or more child nodes in the tree, as described, for example.

It will be appreciated that, in accordance with one or more aspects described herein, inferences can be made regarding quality metric and/or synchronization structure value relationships, as described, to determine desirable wireless nodes for timing synchronization. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events.

Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 9:
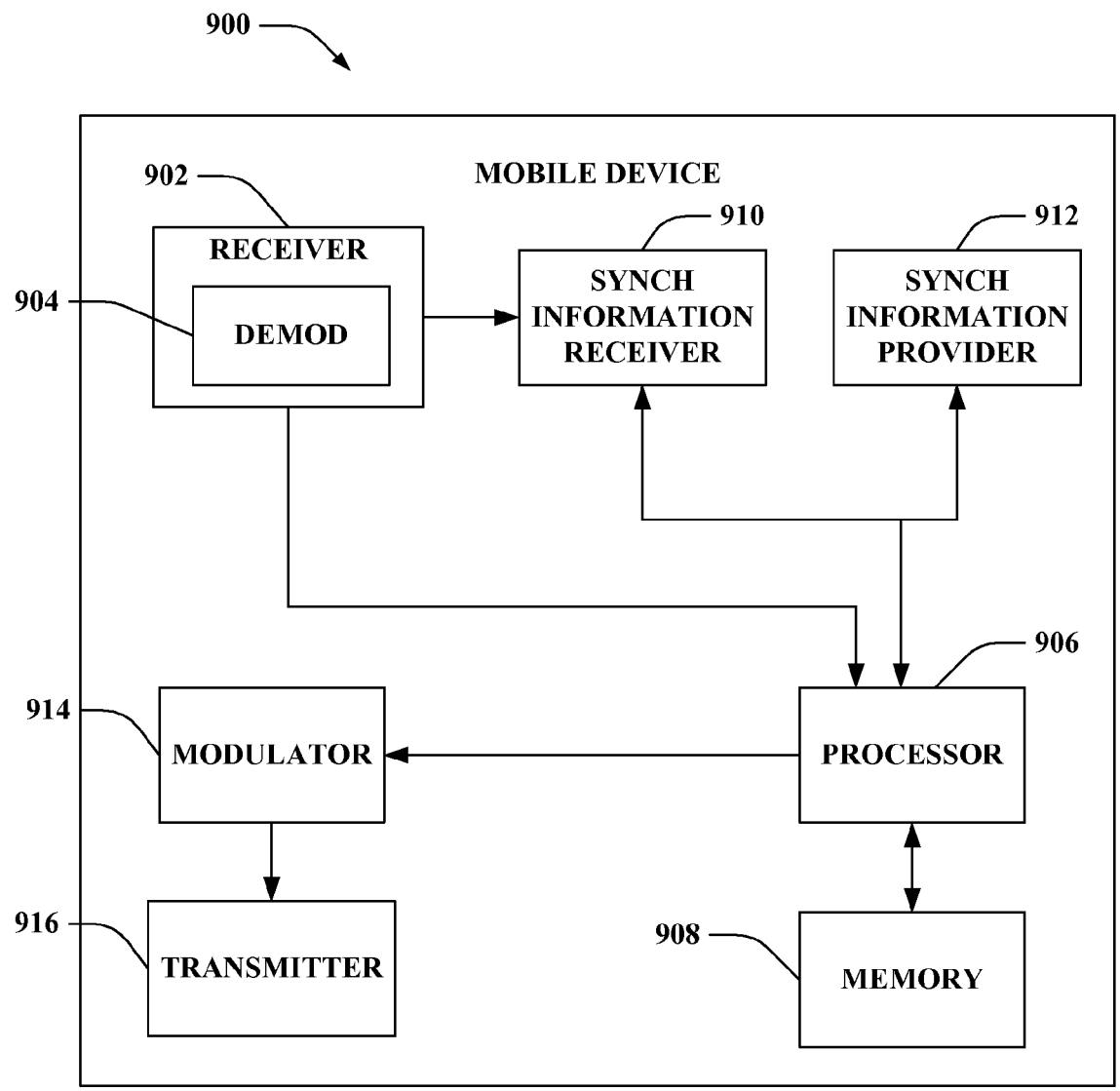
FIG. 9 is an illustration of an example mobile device that facilitates receiving and providing synchronization information from/to various wireless nodes.

FIG. 9 is an illustration of a mobile device 900 that facilitates providing synchronization information to one or more access points. Mobile device 900 comprises a receiver 902 that receives one or more signals over one or more carriers from, for instance, a receive antenna (not shown), performs typical actions on (e.g., filters, amplifies, downconverts, etc.) the received signals, and digitizes the conditioned signals to obtain samples. Receiver 902 can comprise a demodulator 904 that can demodulate received symbols and provide them to a processor 906 for channel estimation. Processor 906 can be a processor dedicated to analyzing information received by receiver 902 and/or generating information for transmission by a transmitter 916, a processor that controls one or more components of mobile device 900, and/or a processor that both analyzes information received by receiver 902, generates information for transmission by transmitter 916, and controls one or more components of mobile device 900.

Mobile device 900 can additionally comprise memory 908 that is operatively coupled to processor 906 and that can store data to be transmitted, received data, information related to available channels, data associated with analyzed signal and/or interference strength, information related to an assigned channel, power, rate, or the like, and any other suitable information for estimating a channel and communicating via the channel. Memory 908 can additionally store protocols and/or algorithms associated with estimating and/or utilizing a channel (e.g., performance based, capacity based, etc.).

It will be appreciated that the data store (e.g., memory 908) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 908 of the subject systems and methods is intended to comprise, without being limited to, these and any other suitable types of memory.

Processor 906 can further be operatively coupled to a synch information receiver 910 that can obtain information regarding timing synchronization from an access point and a synch information provider 912 that can provide timing synchronization information to a disparate access point. For example, the synch information receiver 910 can receive quality metrics related to one or more target access points, as described, from previous communication with the target access points, other mobile devices, and/or the like. The synch information provider 912 can specify quality metrics to be transmitted to a tracking access point, as described. In another example, the synch information receiver 910 can receive timing information from the one or more target access points. In this example, the synch information provider 912 can transmit the information, such as a timing correction message, to disparate tracking access points to facilitate timing synchronization to the desired target access point. Moreover, the synch information provider 912 can transmit information regarding discovered access points to the tracking access points to facilitate subsequent quality metric determination and selection for synchronization, as described in one example. Mobile device 900 still further comprises a modulator 914 and transmitter 916 that respectively modulate and transmit signals to, for instance, a base station, another mobile device, etc. Although depicted as being separate from the processor 906, it is to be appreciated that the synch information receiver 910, synch information provider 912, demodulator 904, and/or modulator 914 can be part of the processor 906 or multiple processors (not shown).

Figure 10:
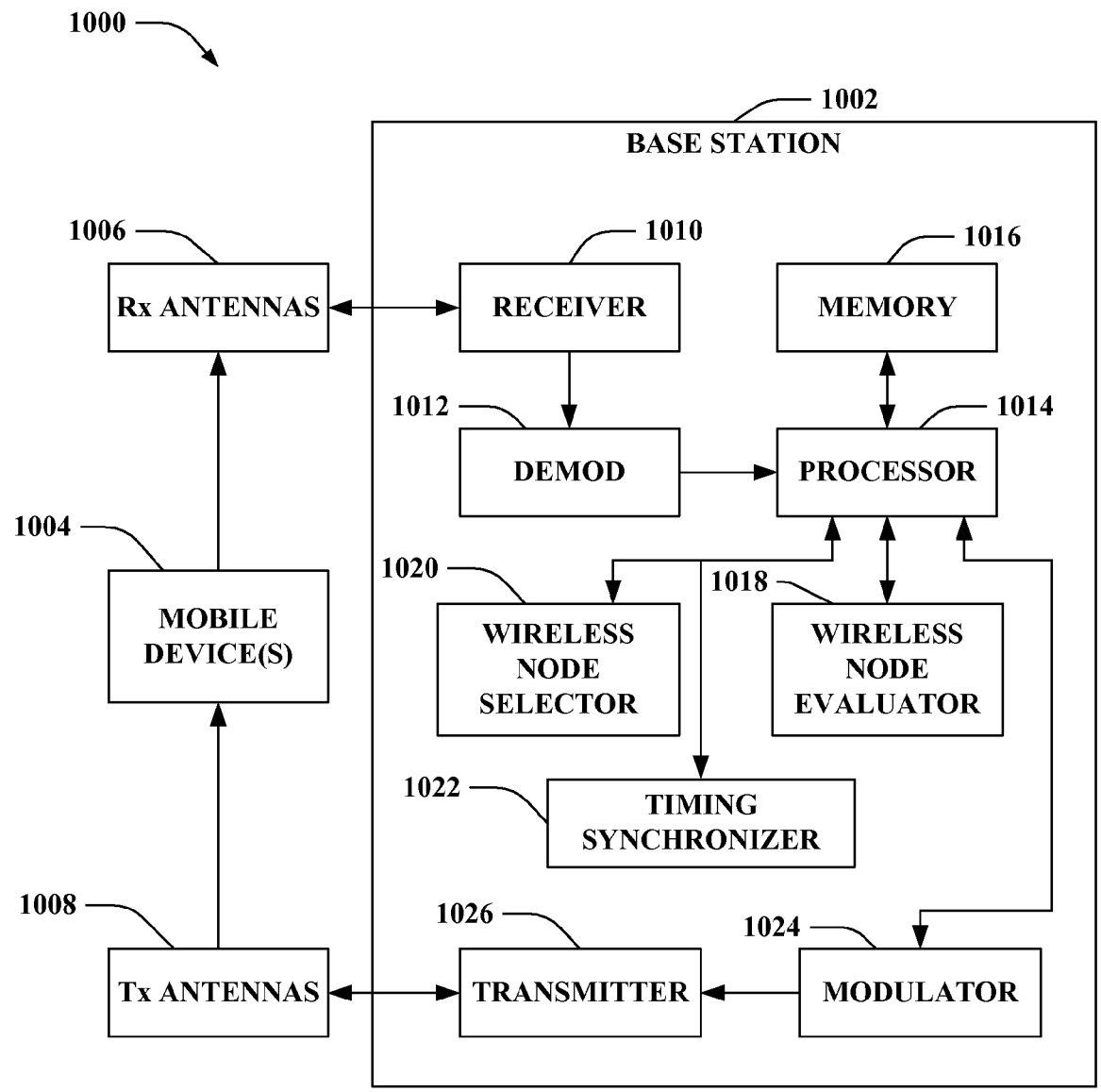
FIG. 10 is an illustration of an example system that synchronizes timing with one or more wireless nodes.

FIG. 10 is an illustration of a system 1000 that facilitates synchronizing timing with nodes in wireless communication networks. The system 1000 comprises a base station 1002 (e.g. access point, . . . ) with a receiver 1010 that receives signal(s) from one or more mobile devices 1004 through a plurality of receive antennas 1006, and a transmitter 1026 that transmits to the one or more mobile devices 1004 through a transmit antenna 1008. Receiver 1010 can receive information from receive antennas 1006 and is operatively associated with a demodulator 1012 that demodulates received information. Demodulated symbols are analyzed by a processor 1014 that can be similar to the processor described above with regard to FIG. 9, and which is coupled to a memory 1016 that stores information related to estimating a signal (e.g., pilot) strength and/or interference strength, data to be transmitted to or received from mobile device(s) 1004 (or a disparate base station (not shown)), and/or any other suitable information related to performing the various actions and functions set forth herein. Processor 1014 is further coupled to a wireless node evaluator 1018 that analyzes one or more wireless nodes to determine quality metrics related thereto, a wireless node selector that chooses a wireless node for timing synchronization based at least in part on the metric, and a timing synchronizer 1022 that adjusts timing of the base station 1002 to substantially match that of the selected wireless node.

According to an example, the wireless node evaluator 1018 can receive quality metrics related to one or more wireless nodes, as described, where the quality metric can relate to an SNR of the wireless nodes, GPS ability, synchronization structures, etc. The wireless node selector 1020 can compare the quality metrics to select a wireless node for synchronization. It is to be appreciated, as described, that substantially any comparison algorithm can be utilized, such as selecting a wireless node with a highest SNR, selecting a wireless node that is GPS-equipped, selecting a wireless node with a lowest hop count, any combination of the foregoing, and/or the like. The timing synchronizer 1022 can adjust timing of the base station 1002 based on that of the selected wireless node, as described. Furthermore, although depicted as being separate from the processor 1014, it is to be appreciated that the wireless node evaluator 1018, wireless node selector 1020, timing synchronizer 1022, demodulator 1012, and/or modulator 1024 can be part of the processor 1014 or multiple processors (not shown).

Figure 11:
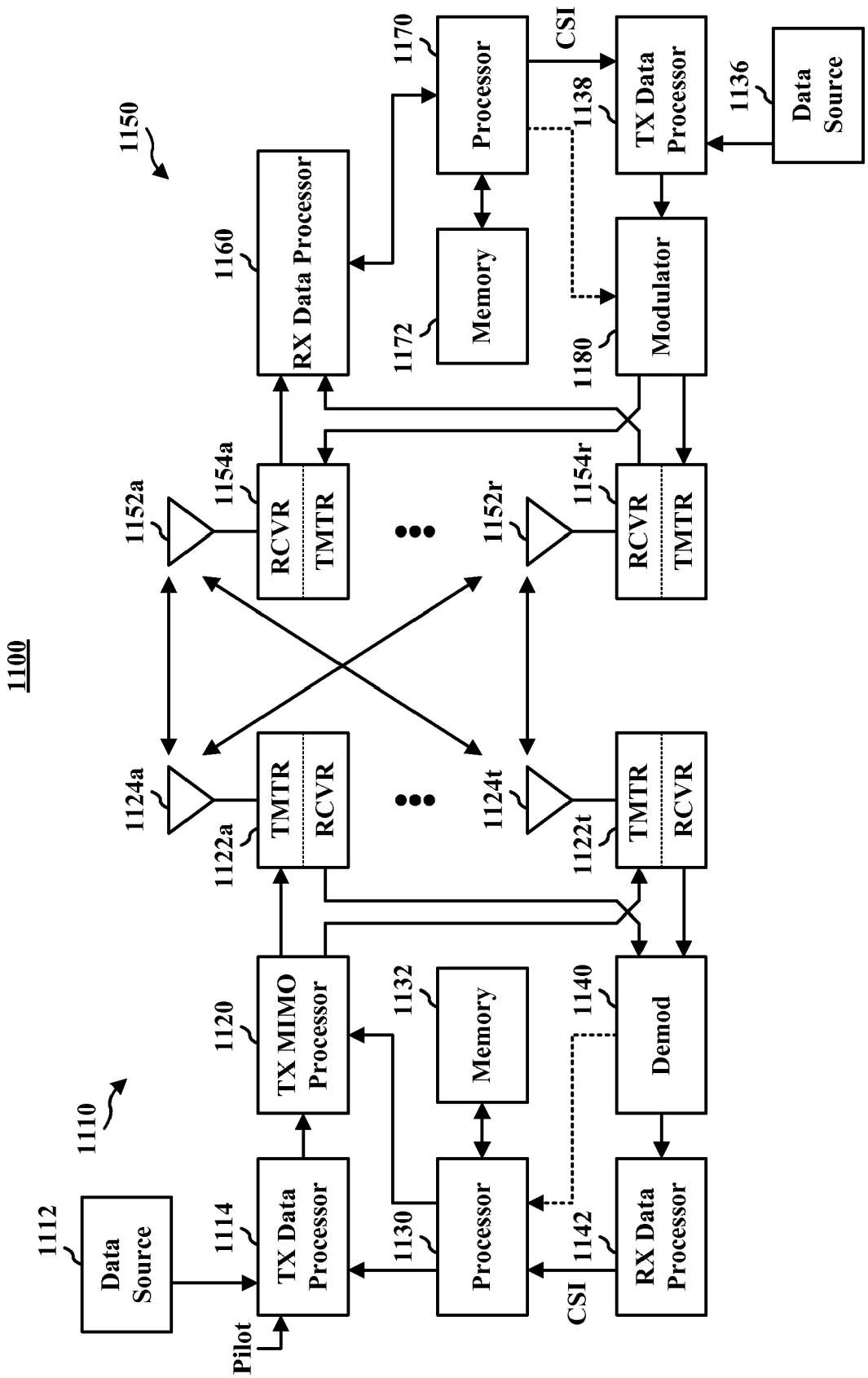
FIG. 11 is an illustration of an example wireless network environment that can be employed in conjunction with the various systems and methods described herein.

FIG. 11 shows an example wireless communication system 1100. The wireless communication system 1100 depicts one base station 1110 and one mobile device 1150 for sake of brevity. However, it is to be appreciated that system 1100 can include more than one base station and/or more than one mobile device, wherein additional base stations and/or mobile devices can be substantially similar or different from example base station 1110 and mobile device 1150 described below. In addition, it is to be appreciated that base station 1110 and/or mobile device 1150 can employ the systems (FIGS. 1-4 and 9-10), state diagrams (FIG. 5) and/or methods (FIGS. 6-8) described herein to facilitate wireless communication there between.

At base station 1110, traffic data for a number of data streams is provided from a data source 1112 to a transmit (TX) data processor 1114. According to an example, each data stream can be transmitted over a respective antenna. TX data processor 1114 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 1150 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 1130.

The modulation symbols for the data streams can be provided to a TX MIMO processor 1120, which can further process the modulation symbols (e.g., for OFDM). TX MIMO processor 1120 then provides $N_T$ modulation symbol streams to $N_T$ transmitters (TMTR) 1122a through 1122t. In various aspects, TX MIMO processor 1120 applies beamforming weights to the symbols of the data streams and to the antenna from which the symbol is being transmitted.

Each transmitter 1122 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 1122a through 1122t are transmitted from $N_T$ antennas 1124a through 1124t, respectively.

At mobile device 1150, the transmitted modulated signals are received by $N_R$ antennas 1152a through 1152r and the received signal from each antenna 1152 is provided to a respective receiver (RCVR) 1154a through 1154r. Each receiver 1154 conditions (e.g., filters, amplifies, and downconverts) a respective signal, digitizes the conditioned signal to provide samples, and further processes the samples to provide a corresponding "received" symbol stream.

An RX data processor 1160 can receive and process the $N_R$ received symbol streams from $N_R$ receivers 1154 based on a particular receiver processing technique to provide $N_T$ "detected" symbol streams. RX data processor 1160 can demodulate, deinterleave, and decode each detected symbol stream to recover the traffic data for the data stream. The processing by RX data processor 1160 is complementary to that performed by TX MIMO processor 1120 and TX data processor 1114 at base station 1110.

A processor 1170 can periodically determine which preceding matrix to utilize as discussed above. Further, processor 1170 can formulate a reverse link message comprising a matrix index portion and a rank value portion.

The reverse link message can comprise various types of information regarding the communication link and/or the received data stream. The reverse link message can be processed by a TX data processor 1138, which also receives traffic data for a number of data streams from a data source 1136, modulated by a modulator 1180, conditioned by transmitters 1154a through 1154r, and transmitted back to base station 1110.

At base station 1110, the modulated signals from mobile device 1150 are received by antennas 1124, conditioned by receivers 1122, demodulated by a demodulator 1140, and processed by a RX data processor 1142 to extract the reverse link message transmitted by mobile device 1150. Further, processor 1130 can process the extracted message to determine which preceding matrix to use for determining the beamforming weights.

Processors 1130 and 1170 can direct (e.g., control, coordinate, manage, etc.) operation at base station 1110 and mobile device 1150, respectively. Respective processors 1130 and 1170 can be associated with memory 1132 and 1172 that store program codes and data. Processors 1130 and 1170 can also perform computations to derive frequency and impulse response estimates for the uplink and downlink, respectively.

It is to be understood that the aspects described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the aspects are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Figure 12:
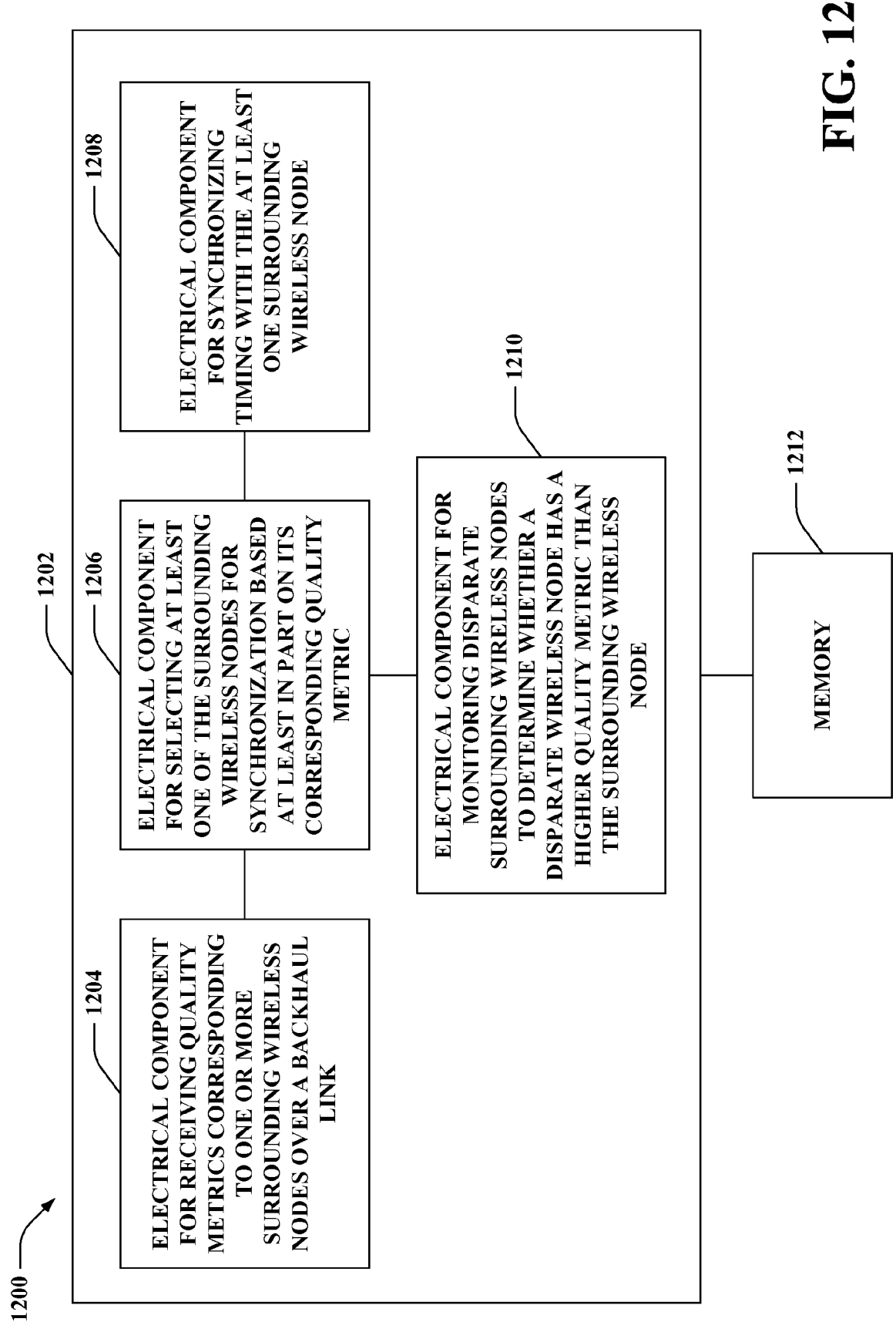
FIG. 12 is an illustration of an example system that facilitates synchronizing timing with one or more surrounding wireless nodes.

With reference to FIG. 12, illustrated is a system 1200 that synchronizes timing with one or more wireless nodes in a wireless communication network. For example, system 1200 can reside at least partially within a base station, mobile device, etc. It is to be appreciated that system 1200 is represented as including functional blocks, which can be functional blocks that represent functions implemented by a processor, software, or combination thereof (e.g., firmware). System 1200 includes a logical grouping 1202 of electrical components that can act in conjunction. For instance, logical grouping 1202 can include an electrical component for receiving quality metrics corresponding to one or more surrounding wireless nodes over a backhaul link 1204. For example, as described, the quality metrics can relate to one or more aspects of the wireless node that can be utilized to select the node over other nodes for timing synchronization (e.g., SNR, GPS information, uptime, synchronization structure parameters, such as root node, hop count, etc., and/or the like). Further, logical grouping 1202 can comprise an electrical component for selecting at least one of the surrounding wireless nodes for synchronization based at least in part on its corresponding quality metric 1206.

As described, the electrical component 1206 can compare quality metrics of the surrounding wireless nodes to determine a wireless node for synchronization; the determination can be made based on which has the highest quality metric, for example. In other examples, the one or more parameters of the quality metric can be evaluated in conjunction to select the wireless node, for example. Furthermore, logical grouping 1202 can include an electrical component for synchronizing timing with the at least one surrounding wireless node 1208. As mentioned above, this can be accomplished through slewing the timing based on that of the wireless node, adjusting the timing in a signal step, and/or the like. In addition, logical grouping 1202 can include an electrical component for monitoring disparate surrounding wireless nodes to determine whether a disparate wireless node has a higher quality metric than the surrounding wireless node 1210. For example, other wireless nodes can be continually evaluated to detect when a wireless node appears with a higher quality metric. This can occur, for example, where the quality metric of the surrounding wireless node is decreased, as described previously. Moreover, where a wireless node with a higher quality metric is detected, the electrical component 1206 can synchronize timing with the new wireless node, in one example. Additionally, system 1200 can include a memory 1212 that retains instructions for executing functions associated with electrical components 1204, 1206, 1208, and 1210. While shown as being external to memory 1212, it is to be understood that one or more of electrical components 1204, 1206, 1208, and 1210 can exist within memory 1212.

With reference to FIG. 13, illustrated is a system 1300 that synchronizes timing on one or more wireless nodes in a wireless communication network. For example, system 1300 can reside at least partially within a base station, mobile device, etc. It is to be appreciated that system 1300 is represented as including functional blocks, which can be functional blocks that represent functions implemented by a processor, software, or combination thereof (e.g., firmware). System 1300 includes a logical grouping 1302 of electrical components that can act in conjunction. For instance, logical grouping 1302 can include an electrical component for comparing a timing of a wireless node with a timing of a disparate wireless node 1304. The timing can be received by evaluating the wireless nodes, requesting the timing, and/or the like. Comparing the timing can indicate whether there is a disparity and/or whether the disparity should be corrected. Further, logical grouping 1302 can comprise an electrical component for transmitting a timing correction signal to the disparate wireless node based at least in part on the comparison 1306. Thus, where the timing is off by a specified threshold, a message can be sent to at least one of the wireless nodes to notify the node of the disparity. Additionally, system 1300 can include a memory 1308 that retains instructions for executing functions associated with electrical components 1304 and 1306. While shown as being external to memory 1308, it is to be understood that one or more of electrical components 1304 and 1306 can exist within memory 1308.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Furthermore, to the extent that the term "includes" is used in either the detailed description or the claims, such term is intended to be inclusive in a manner similar to the term "comprising" as "comprising" is interpreted when employed as a transitional word in a claim. Furthermore, although elements of the described aspects and/or aspects may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method for synchronizing wireless nodes in a wireless communication network, comprising:
    receiving, by a wireless communications apparatus, a quality metric related to a wireless node over a backhaul link;
    determining whether the wireless node can be used as a root node based on the quality metric;
    selecting, by the wireless communications apparatus, the wireless node for synchronization over one or more disparate wireless nodes based at least in part on the quality metric; and
    synchronizing timing with the wireless node.

2. The method of claim 1, wherein synchronizing timing is based at least in part on an over the air synchronization signal transmitted to or received from the wireless node.

3. The method of claim 1, wherein the synchronizing timing comprises synchronizing a timeslot and/or frame numbering.

4. The method of claim 1, wherein the synchronizing timing comprises synchronizing to the wireless node or transmitting a synchronization signal to the wireless node.

5. The method of claim 4, further comprising setting timing to a received timing from a global timing source wherein synchronizing timing comprises transmitting the timing from the global timing source to the wireless node over a backhaul link.

6. The method of claim 5, wherein the global timing source is a global positioning system (GPS), another radio access technology, synchronization signal, or a terrestrial broadcast signal.

7. The method of claim 1, wherein the quality metric comprises an indication of a priority of the wireless node.

8. The method of claim 1, wherein selecting the wireless node is based at least in part on a received over the air (OTA) signal.

9. The method of claim 1, wherein selecting the wireless node is based at least in part on a receiver signal strength or a signal-to-noise ratio of the OTA signal.

10. The method of claim 1, wherein the wireless node is synchronized to at least one disparate wireless node in a tree of wireless nodes having a root node to which substantially all wireless nodes in the tree of wireless nodes are synchronized.

11. The method of claim 10, wherein the quality metric includes a synch metric that identifies the root node and synchronizing timing is based at least in part on the identified root node.

12. The method of claim 1, wherein the quality metric relates to whether the wireless node is synchronized to a global timing source.

13. The method of claim 12, wherein the global timing source is a global positioning system (GPS), another radio access technology, synchronization signal, or a terrestrial broadcast signal.

14. The method of claim 1, wherein the quality metric relates to an uptime of the wireless node.

15. The method of claim 1, wherein the quality metric is received from one or more mobile devices.

16. The method of claim 1, further comprising monitoring disparate neighboring wireless nodes to determine whether a disparate neighboring wireless node has a higher quality metric than the wireless node.

17. The method of claim 1, wherein the backhaul link is a wireless link.

18. A wireless communications apparatus, comprising:
    at least one processor configured to:
        determine quality metrics corresponding to a plurality of wireless nodes received over a backhaul link;
        determine whether the wireless nodes can be used as a root node based on the quality metrics;
        select at least one of the plurality of wireless nodes for synchronization based at least in part on its corresponding quality metric; and
        synchronize timing with the at least one wireless node; and
    a memory coupled to the at least one processor.

19. An apparatus, comprising:
    means for receiving quality metrics corresponding to one or more wireless nodes over a backhaul link;
    means for determining whether the one or more wireless nodes can be used as a root node based on the quality metrics;
    means for selecting at least one of the wireless nodes for synchronization based at least in part on its corresponding quality metric; and
    means for synchronizing timing with the at least one wireless node.

20. A computer program product, comprising:
    a non-transitory computer-readable medium comprising:
        code for causing at least one computer to receive a quality metric related to a surrounding access point over a backhaul link;
        code for determining whether the surrounding access point can be used as a root node based on the quality metric;
        code for causing the at least one computer to select the surrounding access point for synchronization over one or more disparate surrounding access points based at least in part on the quality metric; and
        code for causing the at least one computer to synchronize timing with the surrounding access point.

21. An apparatus, comprising:
    a wireless node evaluator that receives a quality metric related to a wireless node over a backhaul link;
    a determining unit that determines whether the wireless node can be used as a root node based on the quality metric;
    a wireless node selector that selects the wireless node for synchronization over one or more disparate wireless nodes based at least in part on the quality metric; and a timing synchronizer that synchronizes timing with the wireless node.

22. The apparatus of claim 21, wherein the timing synchronizer adjusts timing based at least in part on an over the air synchronization signal transmitted to or received from the wireless node.

23. The apparatus of claim 21, wherein the timing synchronizer adjusts timing based on a timeslot and/or frame numbering of the wireless node.

24. The apparatus of claim 21, wherein the timing synchronizer transmits a timing synchronization signal to the wireless node.

25. The apparatus of claim 24, wherein the timing synchronizer synchronizes timing of the apparatus with a received timing from a global timing source and transmits the timing to the wireless node over a backhaul link in the timing synchronization signal.

26. The apparatus of claim 25, wherein the global timing source is a global positioning system (GPS), another radio access technology, synchronization signal, or a terrestrial broadcast signal.

27. The apparatus of claim 21, wherein the wireless node selector selects the wireless node based at least in part on a received over the air (OTA) signal.

28. The apparatus of claim 21, wherein the wireless node selector selects the wireless node based at least in part on a receiver signal strength or a signal-to-noise ratio of the OTA signal.

29. The apparatus of claim 21, wherein the wireless node is synchronized to at least one disparate wireless node in a tree of wireless nodes having a root node to which substantially all wireless nodes in the tree of wireless nodes are synchronized.

30. The apparatus of claim 29, wherein the quality metric includes a synch metric that identifies the root node and the timing synchronizer synchronizes timing with the wireless node based at least in part on the root node.

31. The apparatus of claim 21, wherein the quality metric relates to whether the wireless node is synchronized to a global timing source.

32. The apparatus of claim 31, wherein the global timing source is a global positioning system (GPS), another radio access technology, synchronization signal, or a terrestrial broadcast signal.

33. The apparatus of claim 21, wherein the quality metric relates to an uptime of the wireless node.

34. The apparatus of claim 21, wherein the wireless node evaluator receives the quality metric from one or more mobile devices.

35. The apparatus of claim 21, further comprising a synchronization monitor that monitors disparate neighboring wireless nodes to determine whether a disparate neighboring wireless node has a higher quality metric than the wireless node.

36. The apparatus of claim 21, wherein the backhaul link is a wireless link.

* * * * *